United States Patent [19]

Bringi et al.

[11] 4,060,646

[45] Nov. 29, 1977

[54] FOOD FAT

[75] Inventors: Naganathan Viswanath Bringi, Bombay, India; Frederick Bolton Padley, Welwyn Garden City, England

[73] Assignee: Lever Brothers Company, New York, N.Y.

[21] Appl. No.: 712,669

[22] Filed: Aug. 9, 1976

[30] Foreign Application Priority Data

Aug. 8, 1975 United Kingdom ............... 33168/75

[51] Int. Cl.$^2$ .......................... A23G 1/00; A23D 5/00
[52] U.S. Cl. ..................................... 426/607; 426/631; 426/660
[58] Field of Search ............... 426/606, 607, 631, 660; 260/398, 405.5, 428, 428.5

[56] References Cited

U.S. PATENT DOCUMENTS

| | | | |
|---|---|---|---|
| 3,012,891 | 12/1961 | Best et al. | 426/607 |
| 3,171,748 | 3/1965 | Galenkamp | 426/607 |

OTHER PUBLICATIONS

Chem. Abstracts, vol. 27, 1948, 389.

Primary Examiner—Raymond N. Jones
Assistant Examiner—R. A. Yoncoskie
Attorney, Agent, or Firm—Michael J. Kelly; Melvin H. Kurtz; James J. Farrell

[57] ABSTRACT

A fraction of mango kernel fat is obtained which is substantially free from glycerides containing more than one unsaturated fatty acid moiety and is suitable for use in confectionery compositions, particularly as a replacement fat for cocoabutter. The fat is preferably obtained by fractional crystallization from inert organic solvents, particularly acetone.

11 Claims, No Drawings

FOOD FAT

This invention relates to hard butters which are used in confectionery and provides a fat composition for this purpose comprising mango kernel fat which is substantially free from glycerides containing more than one unsaturated fatty acid radical.

The kernel stone of mangoes weighs about one-eighth of the total fruit and contains 9 to 13% of oil, obtained as a cream-coloured semi-solid by hexane extraction after drying and pulverising the stone. Its melting point is usually about 45° C. A typical analysis of the fat is as follows:

|  | Weight % |
|---|---|
| Moisture | 0.08 |
| Free fatty acids | 3.0 |
| Iodine Value (Wijs) | 45 |
| Unsaponifiable matter | 1.5 |

According to Hilditch and Williams (The Chemical Constitution of Natural Fats, 1964) mango kernel fat (Mangifera indica, Anacardiaceae) is a member of a group of seed fats containing 30 to 65% of saturated acids in their component fatty acids in which stearic acid is prominent. According to the same source the fat contains the following mole % of acids: myristic 0.9, palmitic 9.7, stearic 33.7, arachidic 6.0, oleic 49.7, but more recent analysis shows that the fat may contain as much as 6% linoleic acid. Pathak, Gunde and Godbole (Indian Soap Journal 1946) disclose the following distribution in mole %: palmitodistearine 9, tristearine 5, stearodioleine 54, oleopalmitostearine 16, oleodistearine 8 and palmitodioleine 7.

More recent analysis has shown that mango kernel fat contains the following weight % triglycerides: 2-oleodipalmityl 1,2-oleopalmityl stearyl 11 and 2-oleodistearyl 29. Mango kernel fat is therefore comparatively rich in symmetrical mono-unsaturated-disaturated glycerides. These components possess melting characteristics which are highly prized in confectionery fats. In accordance with the invention, the lower melting fractions containing two or more unsaturated fatty acids are eliminated from mango kernel fat to provide the compositions according to the invention.

The compositions of the invention are preferably characterised by a Jensen cooling curve maximum temperature, on a 75 gm sample, above about 28° C, especially 30° to 40° C, and a dilatation range of at least 500 at 35° C and 2000 at 30° C, measured in accordance with the method described in British Pat. No. 827,172. Mango fat may contain appreciable amounts, up to about 25%, of free fatty acid but the compositions of the present invention preferably include less than 5% free fatty acid. The Iodine Value should be less than 50, preferably 25 to 45.

The compositions of the invention are preferably obtained by fractionation from the parent fat, from which they may be obtained in about 50% yield. Triglycerides containing more than one unsaturated fatty acid radical vary in amount from one sample to another but generally amount to about one-third of the total glyceride content of the parent fat. Preferably the compositions of the invention are provided by an upper fraction amounting to between 20 and 70% by weight of the original fat, depending upon the quality of the oil and of the fraction required. Smaller fractions may exhibit melting points that are too high for most confectionery purposes, whereas larger fractions contain increasing amounts of the diunsaturated triglyceride components of the fat and have melting characteristics which are too low for these purposes.

Fractionation is preferably effected by fractional crystallisation, particularly from solution in an inert, organic solvent, those having a boiling point between 50° and 100° C being particularly suitable. They include paraffins and their halo and nitro derivatives, for example dichlorodifluoromethane and nitropropane. Preferably however the solvent used is a lower aliphatic ketone, particularly acetone. Commercial acetone contains a small amount, e.g. up to 1%, of water but is suitable for effection fractional crystallisation, which is preferably carried out at from 0° to 15° C from a 10–30%, preferably approximately 20%, solution of the fat.

Solvent fractionation of mango kernel fat may be carried out under conditions generally familiar to those skilled in the art. The fat is completely dissolved in the solvent, if desired at elevated temperature, for example 30° to 60° C and may be allowed to cool undisturbed but is preferably stirred to reduce the time required to achieve fractional crystallisation. Cooling may also be effected by distilling off part of the solvent under reduced pressure. Separation of the crystallised fat from the mother liquor may be effected by filtration or centrifugation and accompanied with the application of vacuum or pressure. The recovered crystals are preferably washed with solvent at 1° or 2° C below the crystallisation temperature.

Fractionation is also possible by dry techniques in which the liquid components of the fat are expressed from the solid components of the fractionation temperature and by aqueous methods in which the solid components of the fractionation temperature are washed free from liquid glycerides with an aqueous solution of a suitable surfactant capable of wetting the fat crystals.

Fractional crystallisation may be effected in a single stage, or in two stages to remove both the lower melting fraction containing substantially all the diunsaturated glycerides and an upper melting fraction containing at least a proportion of the trisaturated glycerides which may be present, particularly in low quality mango kernel fat, the mid-fraction thus obtained then consisting largely of disaturated glycerides in which the unsaturated fatty acid component, consisting almost entirely of oleic acid radicals, occupies the central ester linkage of the glyceride radical. Where the upper fraction is sufficiently wide to contain an enrichment of symmetrical mono-unsaturated disaturated glycerides, these and also the mid-fraction obtained, are products meeting the requirements of the invention, both being substantially free from triglycerides containing more than one unsaturated fatty acid radical.

Fractionation to provide the products of the invention may also be effected by fractional extraction in which a proportion only of the fat is dissolved in a solvent, the dissolved portion consisting chiefly of the diunsaturated components and the required fraction, being enriched in disaturated glycerides, is left undissolved.

The compositions of the invention may also be obtained from mango kernel fat by careful hydrogenation, as an alternative to but preferably in conjunction with fractionation of the fat. Hydrogenation as the sole means of eliminating the more highly unsaturated components of the fat is a very difficult procedure. If selective conditions are provided to avoid saturating oleyl radicals, trans-isomerisation occurs to form elaidic acid radicals, increasing melting characteristics unduly. While nonselective conditions are therefore preferred it is then difficult to limit hydrogenation to avoid saturating the fat. When combined with fractionation however, hydrogenation may be adopted to improve the recovery of disaturated glycerides from the fat. Hydrogenation is preferably limited to a drop in Iodine Value of up to 10, preferably up to 5.

The mango kernel fat compositions of the invention may be used in good quality chocolate to replace at least part of the cocoabutter normally present, together with sugar and cocoa nib. They may also be used in the preparation of such products as couvertures in which hard butters prepared from cheaper vegetable fats or their fractions are used instead of cocoabutter. For either of these purposes the fat fractions of the invention may be used alone apart from cocoabutter as the principal fat source, but preferably they are used in blends with other suitable fats including in particular a palm oil fraction having an Iodine Value not exceeding 45, a dilatation at 20° C of not less than 1000 and a softening point between 30° and 45° C, as disclosed in our British Pat. No. 827,172. In addition or alternatively, the fat fractions according to the invention may be blended with hard butters produced from different sources, particularly naturally occurring vegetable fats other than cocoabutter and especially Borueo tallow commonly marketed under the name Illipe butter and similar fats including shea stearines as obtained, for example, in accordance with British Pat. No. 925,805. Preferably the resulting compositions contain at least 5% mango kernel fat fractions, especially up to 50% and particularly 5-30%.

EXAMPLE 1

410 gms of crude mango kernel oil were fractionated at 15° C from a 20% solution of the oil in acetone, cooled from 50° C at a rate of approximately 1° C per minute with a period of one hour at the final temperature before separating the crystals from the mother liquor by filtration.

A yield of 22% (90 gms) of crude stearine fraction was obtained, together with 78% (320 gms) of an oleine fraction dissolved in the acetone. The crystals were washed three times with 410 mls of acetone each time, leaving the filtercake fairly dry and crumbly and mid-grey in colour.

The oleine fraction was recovered by evaporation of the solvent. The parent oil and oleine and stearine fractions were examined by conventional methods with the following results:

TABLE 1

|  | Oil | Oleine | Stearine |
|---|---|---|---|
| Iodine Value (Wijs) | 46.3 | 51.9 | 27.3 |
| Wt % diglyceride | 8.4 | 8.5 | 0.8 |
| Wt % unsaponifiable matter | 0.8 | ND | ND |
| Wt % free fatty acids total | 25.9 | 31.6 | 0.48 |
| Wt % combined fatty acids |  |  |  |
| $C_{14}$ | 0.1 | 0.3 | 0.2 |
| $C_{16}$ | 7.6 | 9.0 | 4.5 |
| $C_{18}$ | 43.7 | 36.9 | 58.8 |
| $C_{20}$ | 2.3 | 3.1 | 3.5 |
| $C_{18:1}$ | 41.8 | 44.4 | 32.1 |
| $C_{18:2}$ | 4.5 | 6.3 | 0.9 |
| Jensen $T_{max}$ ° C |  |  | 37.1 |
| $T_{min}$ ° C |  |  | 28.2 |

TABLE 1-continued

|  | Oil | Oleine | Stearine |
|---|---|---|---|
| Mins. to max. |  |  | 49 |

The stearine fraction also showed the following dilatations, measured by the method of British Pat. No. 925,805: $D_{15}$ 2060, $D_{25}$ 2055, $D_{30}$ 1880, $D_{32.5}$ 1465, $D_{35}$ 495, $D_{40}$ 95, $D_{45}$ 50, $D_{60}$ 0.

ND = Not determined.

EXAMPLE 2

In Example 1 the free fatty acid content was reduced to acceptable limits in the stearine by the fractionation. In this Example stearine fractions were obtained from crude mango kernel fat with neutralisation before or after the crystallisation, by adding a substantially similar amount of 15% sodium carbonate solution to the fat in portions at 95° C and removing at intervals the soapstock formed. The fractionation was effected in dry acetone at 5 (crude fat) or 5.5 parts (neutral fat) by weight per unit weight of fat at 9.5° and 12.5° C with residence times of 25 and 30 minutes and with 3 acetone washes of 15% at 10.5° and 12° C respectively.

Particulars of yields and properties of the neutralised fats appear in the accompanying Table 2.

TABLE 2

|  | Neutral Mango Kernel Fat | Stearine from Neutral Fat | Neutral Stearine from Crude Fat |
|---|---|---|---|
| Yield on crude fat | 42% | 23% | 17% |
| I.V. (Wijs) | 48.4 | 35.8 | 33.0 |
| F.F.A. % | 0.14 | 0.06 | 0.05 |
| Colour 1 cm cell Lovibond | 3.0/39.1/0.1 | 4.3/20.0/0.1 | 2.3/4.0/0.2 |
| Jensen Cooling Curve |  |  |  |
| T max ° C | 30.1 | 36.1 | 36.1 |
| T min ° C | 22.7 | 26.1 | 27.0 |
| Δ T ° C | 7.4 | 10.0 | 9.1 |
| Time mins | 56 | 46 | 41 |
| Stabilised Dilatations |  |  |  |
| D20 | 1290 | 2355 | 2480 |
| D25 | 1270 | 2360 | 2530 |
| D30 | 1030 | 2285 | 2490 |
| D32.5 | 625 | 2090 | 2320 |
| D35 | 105 | 1590 | 1910 |
| D40 | 0 | 30 | 20 |
| Calve slip melting point ° C | 29.0 | 33.0 | 33.0 |
| C16:0 | 6.9 | 6.1 | 6.7 |
| C16:1 | 0.2 |  | 0.1 |
| C18:0 | 41.4 | 52.2 | 54.9 |
| C18:1 | 43.9 | 36.4 | 32.7 |
| C18:2 | 4.6 | 2.2 | 1.9 |
| C18:3 | 0.5 | 0.2 |  |
| C20:0 | 2.5 | 2.8 | 3.4 |

EXAMPLE 3

All three stearine products obtained in the preceeding Examples produced chocolate compositions of excellent characteristics from the following recipes:

|  | Chocolate type | |
|---|---|---|
| Ingredient wt % | Dark | Milk |
| Cocoa mass | 4.0 | 10.0 |
| Cocoabutter | 6.5 | 17.5 |
| Mango stearine* | 5.0 | 5.0 |
| Full cream milk powder | — | 22 |
| Sugar | 48.1 | 45.1 |
| Lecithin | 0.4 | 0.4 |
|  | 100 | 100 |
| Fat content* wt % total | 33.5 | 33.5 |

-continued

| Ingredient wt % | Chocolate type | |
|---|---|---|
| | Dark | Milk |
| Cocoabutter wt % of fat | 85 | 69 |
| Mango component | 15 | 16 |
| Milk fat | — | 15 |
| | 100 | 100 |

*Calculated assuming cocoa mass contains 45 wt % cocoabutter.

EXAMPLE 4

Blends of mango kernel stearine fat compositions in accordance with the invention were made with other vegetable fats suitable for use in confectionery and examined in comparison with the individual fats, as described in Table 3.

TABLE 3

| Component | Wt % | | | | | |
|---|---|---|---|---|---|---|
| Mango kernel stearine | 15 | 4.5 | 30 | 100 | — | — |
| Cocoabutter | 85 | 85 | — | — | 100 | — |
| Palm mid-fraction | — | 10.5 | 70 | — | — | 100 |
| Solids content* % at ° C | | | | | | |
| 20 | 78 | 73 | 64 | 93 | 85 | 75 |
| 25 | 71 | 66 | 49 | 92 | 71 | 69 |
| 30 | 56 | 49 | 36 | 90 | 39 | 45 |
| 32.5 | 32 | 16 | 6 | 85 | 7 | 15 |
| 35 | 5 | — | — | 74 | — | 1 |
| 40 | — | — | — | 4 | — | — |

*Pulsed NMR measurement on fat stabilised as follows:-
60° C ½ hour    26° C 40 hours
0° C 1½ hours   each reading 1 hour.

What is claimed is:

1. A processed fat composition, containing; processed Mango kernel fat, wherein;
    said processed Mango kernel fat,
    a. is substantially free from glycerides containing at least two unsaturated fatty acid residues;
    b. has an Iodine Value of less than 50; and
    c. has melting characteristics suitable for confectionary purposes.

2. A composition according to claim 1 wherein said Iodine Value is 25 to 45.

3. A composition According to claim 1 wherein said processed Mango kernel fat has a Jensen cooling curve maximum temperature above 28° C.

4. A composition according to claim 3 wherein said Jensen cooling curve maximum temperature is from 30° to 40° C.

5. A composition according to claim 1 wherein said processed Mango kernel fat has a dilatation range of at least 500 at 35° C and 2,000 at 30° C.

6. A composition according to claim 1 wherein said processed Mango kernel fat is a stearine fraction of Mango kernel fat.

7. A composition as claimed in claim 1 comprising a blend of at least one fat selected from the group consisting of a palm oil fraction, vegetable butter or fractions thereof wherein said palm oil fraction is a fraction having
    a. an Iodine Value not exceeding 45,
    b. a dilatation at 20° C of not less than 1,000 and
    c. a softening point between 30° and 34° C.

8. A composition according to claim 7 wherein said processed Mango kernel fat is present in said blend at a level of from 5% to 30%.

9. A chocolate composition comprising a processed fat component as claimed in claim 1.

10. Method of preparing a fat composition as claimed in claim 1 comprising removing from Mango kernel fat substantially all glycerides containing more than one unsaturated fatty acid residue.

11. Method according to claim 10 comprising cooling a solution of mango kernel fat in an inert organic solvent boiling between 50° and 100° C at a concentration from 10 to 30%, to a temperature at which a precipitate is formed which is substantially free from glycerides containing more than one unsaturated fatty acid residue and separating the precipitate from the mother liquor.

* * * * *